United States Patent [19]

Matsui et al.

[11] Patent Number: 5,158,021
[45] Date of Patent: Oct. 27, 1992

[54] SKI LIFT WITH VARIABLE SPEED LINEAR MOTOR DRIVE AND EMERGENCY STOP APPARATUS RESPONSIVE TO POWER LOSS TO THE DRIVE

[75] Inventors: Nobuyuki Matsui; Tatsuyuki Ochi, both of Tokyo, Japan

[73] Assignee: Kajima Corporation, Tokyo, Japan

[21] Appl. No.: 635,342

[22] Filed: Dec. 28, 1990

[51] Int. Cl.5 .............................................. B60L 13/02
[52] U.S. Cl. ........................................ 104/292; 104/93
[58] Field of Search ...................... 104/93, 290, 292; 105/32, 125, 128, 150

[56] References Cited

U.S. PATENT DOCUMENTS

| | | | |
|---|---|---|---|
| 3,792,665 | 2/1974 | Nelson | 104/292 |
| 3,937,147 | 2/1976 | Szent-Miklosy | 104/93 |
| 4,284,010 | 8/1981 | Marshall | 104/292 |
| 4,819,564 | 4/1989 | Brandis et al. | 104/292 |
| 4,922,830 | 5/1990 | Fujita et al. | 104/290 |
| 4,931,677 | 6/1990 | Heidelberg et al. | 104/292 X |

Primary Examiner—Robert J. Oberleitner
Assistant Examiner—S. Joseph Morano
Attorney, Agent, or Firm—James H. Tilberry

[57] ABSTRACT

A ski chair lift with variable speed drive for each chair. A linear motor is used in lieu of the conventional closed loop tow cable. The stator of the linear motor includes a closed loop I-beam guide rail, electromagnets secured to the top flange of the I-beam, and permanent magnets secured to chair lift carriers which are driven by selective energization of the electromagnets. Failsafe stops and brakes delimit movement of the chairs on the guide rail in the event of a power failure.

6 Claims, 4 Drawing Sheets

SKI LIFT WITH VARIABLE SPEED LINEAR MOTOR DRIVE AND EMERGENCY STOP APPARATUS RESPONSIVE TO POWER LOSS TO THE DRIVE

BACKGROUND OF THE INVENTION

1. Field of the Invention:

This invention relates to the field of ski lifts and means to convey individual chairs continuously about a ski lift circuit.

2. Description of the Prior Art:

It is generally known that ski lift chairs are fastened to a suspended steel cable which is moved continuously around a closed path. In this conventional type of lift, each chair is permanently fastened to the cable, so that the spacing between the chairs is constant and the travel speed of each chair is the same as that for each other chair. As a consequence, skiers must be able to mount and dismount chairs which cannot be slowed to render these maneuvers to be accomplished more easily and/or more safely. Thus it is difficult for beginning skiers to learn to master mounting and dismounting techniques. In an effort to solve this problem, modifications have been made to conventional ski lifts wherein individual chairs can be shifted at the mounting and dismounting stations to slower moving conveyor means for a limited period of time in order to facilitate skier chair lift mounting and dismounting procedures. However, these systems are complicated, require a considerable amount of additional equipment and space, and, as a result, are more expensive than a conventional cable chair lift and require more maintenance.

SUMMARY OF THE INVENTION

The present invention comprises a ski chair lift in which both the distance between chairs and the speed of each chair may be varied in order to provide more time for a skier to mount or to dismount from a chair.

Instead of the conventional chair lift tow cable, an overhead guide rail supports the chairs and defines their path of travel. In a preferred embodiment of the invention, the guide rail is a continuous closed loop I-beam having a vertical web and horizontal top and bottom flanges. The top surface of the top flange has secured thereto a plurality of longitudinally aligned, equidistantly spaced, electromagnets extending along the entire top surface of the I-beam guide rail. A chair lift carrier is supported and adapted to run on the top surface of the bottom flange of the guide rail. A permanent magnet is secured to each carrier and positioned proximate the electromagnets so as to constitute a linear electric motor when the electromagnets are energized to drive the carrier along the guide rail. By varying the energization of the individual electromagnets, the spacing between carriers and the speed of each carrier may be varied at will. This phenomenon is utilized in the subject invention by slowing the speed of the chairs at the mounting and dismounting stations and by increasing their speed between stations. Various refinements are also available wherein the chairs may be moved at high speeds over certain portions of the lift, and at slower speeds over other portions of the lift.

OBJECTS OF THE INVENTION

It is therefore a principal object of this invention to provide a variable speed chair lift which is simple in concept and structure while providing the same features of more complex and more expensive cable-driven type chair lifts, and while requiring less space and less maintenance.

BRIEF DESCRIPTION OF THE DRAWINGS

The foregoing and other objects and features of the invention will become apparent from the following description of a preferred embodiment of the invention with reference to the accompanying drawings, in which.

DESCRIPTION OF THE PREFERRED EMBODIMENT OF THE INVENTION

Figure 1:
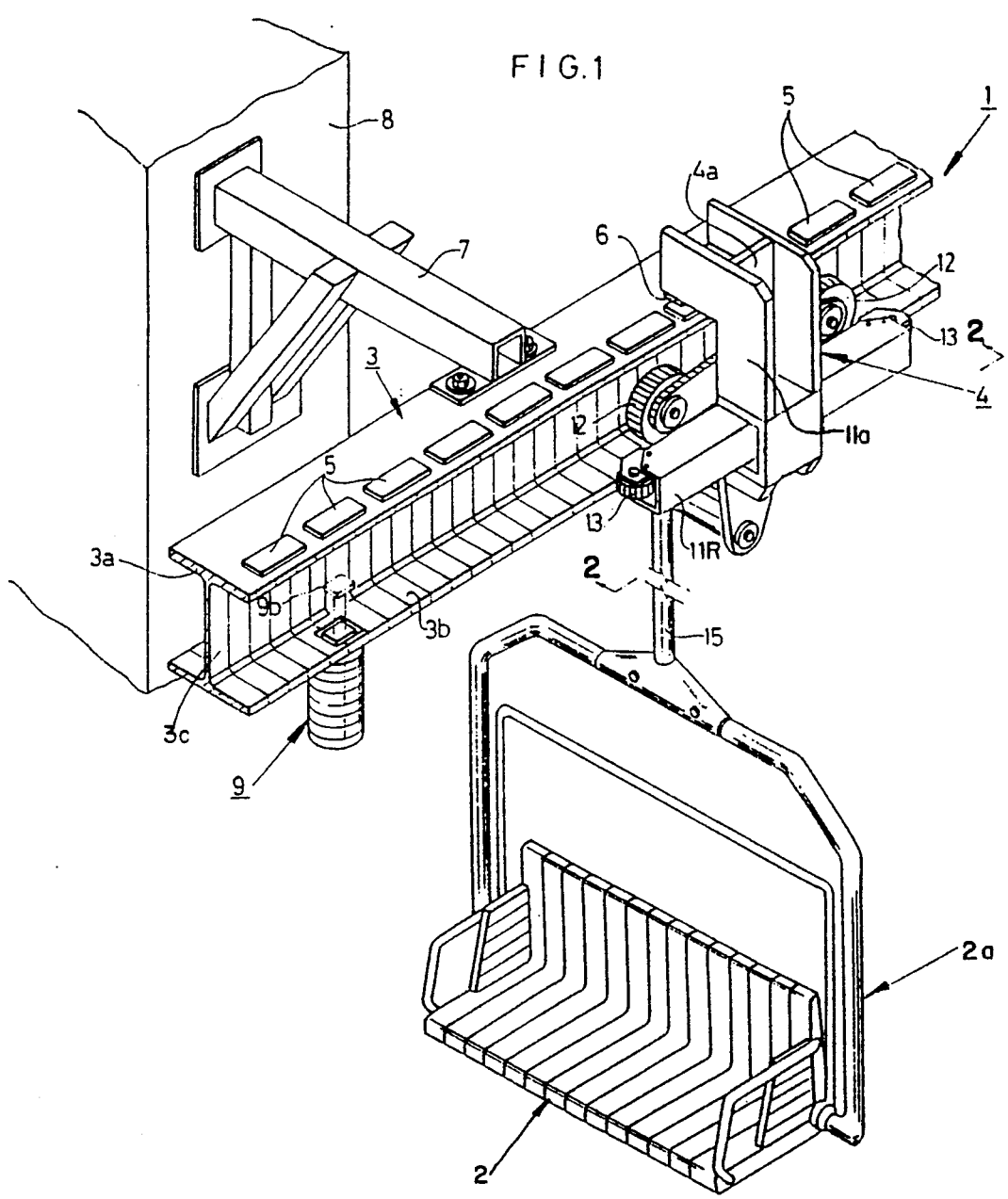
FIG. 1 is a perspective view of a preferred embodiment of the invention showing the overall organization of the device.
Figure 2:
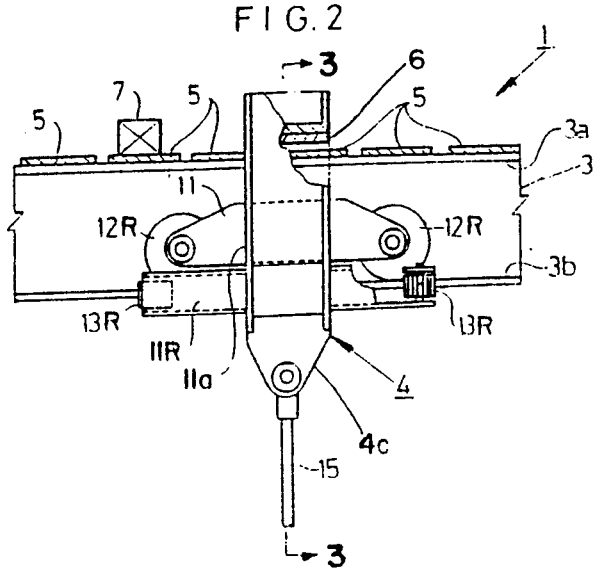
FIG. 2 is a fragmentary view taken substantially along the line 2—2 of FIG. 1.
Figure 5:
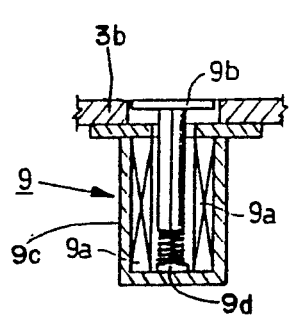
FIGS. 5 and 6 are, respectively, sectional views showing the operational conditions of a failsafe device to prevent chairs from colliding in the event of a power failure.
Figure 6:
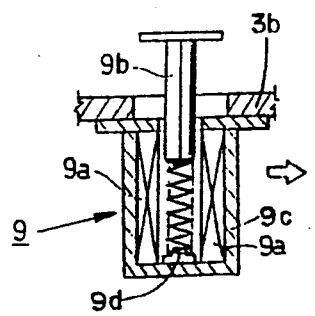

Referring first to FIG. 1, a variable speed chair lift 1 comprises an I-beam guide rail 3 for guiding the travel of a plurality of chair lifts 2, supported by a plurality of carriers 4. The guide rail 3 comprises an I-beam having a top horizontal flange 3a, a bottom horizontal flange 3b, and a vertical web 3c. A plurality of rectangular electromagnets 5, longitudinally aligned and equidistant one from another, are secured to the top surface of guide rail top flange 3a. The guide rail is suspended from a cantilever beam 7 which is mounted on a chair lift tower 8. Chair lift failsafe stops, indicated generally at 9 in FIG. 1, and in detail in FIGS. 5 and 6, are positioned at predetermined intervals in guide rail lower flange 3b. An energizable coil 9a and a plunger 9b are concentrically positioned within housing 9c. Coil 9a is energized during operation of the chair lift to hold plunger 9b within housing 9c, as shown in FIG. 5. When coil 9a is de-energized, such as by a power outage, spring 9d urges plunger 9b upwardly to project above the surface of lower flange 3b, FIG. 6. Any carriage which is acted upon by gravity to roll on flange 3b during a power outage will move no farther than the first plunger which is encountered projecting above flange 3b.

Figure 3:
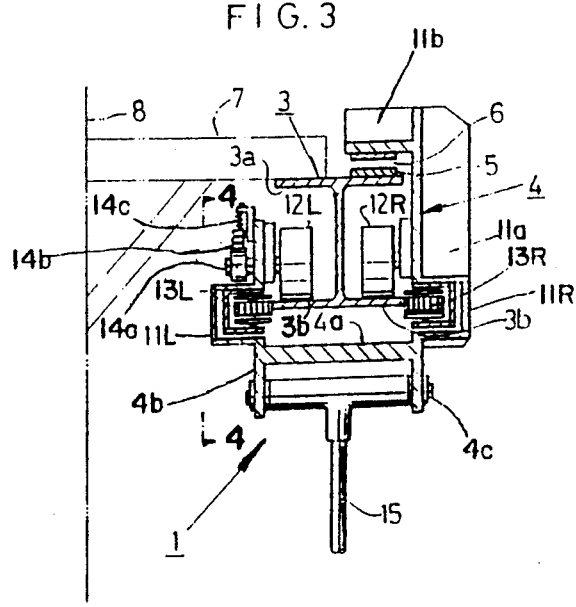
FIG. 3 is a sectional view taken along the line 3—3 of FIG. 2.

Carrier 4 comprises roller mounting brackets 11L and 11R, FIG. 3, to which rollers 12L and 12R are respectively journaled to roll about horizontal axes on the upper surfaces of flanges 3b. Side thrust rollers 13L and 13R are also journaled in brackets 11L and 11R, respectively, to roll about vertical axes against the horizontal edges of flanges 3b. A cross member 4a rigidly secures bracket 11L to bracket 11R and provides dependent flange means 4b and 4c to pivotally secure chair lift T-bar support 15. An inverted L-shaped vertically upstanding bracket 11a is rigidly secured to bracket 11R. A horizontal leg portion 11b is cantilevered over upper flange 3a and a permanent magnet 6 is attached to its undersurface and aligned directly over the path of electromagnets 5 secured to the top face of flange 3a.

Figure 4:
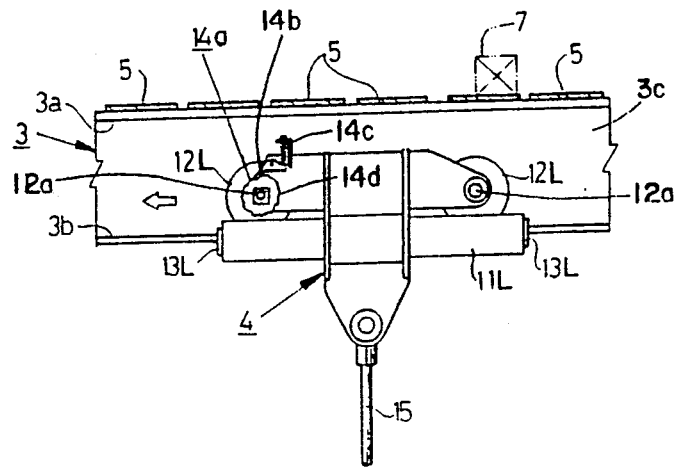
FIG. 4 is a fragmentary view taken generally along the line 4—4 of FIG. 3.

In addition to the failsafe plunger 9b to prevent uncontrolled movement of the carrier 4 on guide rail 3, a ratchet mechanism is secured to one or more shafts 12a of rollers 12, FIG. 4. The ratchet mechanism comprises a ratchet wheel 14a, a detent 14b, and a detent spring 14c. The detent 14b will permit roller 12 to rotate freely in one direction. However, if the roller 12 attempts to turn in the opposite direction, the detent 14b will be urged by spring 14c into engagement with one of the teeth 14d on the ratchet wheel 14a, thereby stopping further turning of the roller 12.

Each chair lift 2, FIG. 1, is rigidly secured to a U-shaped support bar 2a which is connected to the lower end of chair lift T-bar support 15. The combination of a plurality of electromagnets 5 and a permanent magnet 6 comprises a variable speed linear motor when the electromagnets are energized pursuant to predetermined controlling means, as is well understood by those skilled in the art. The polarities of the electromagnets are adapted to reverse in predetermined order so as to provide maximum attractive and repulsive thrusts between the North and South poles of the permanent magnet 6 and the North and South poles of the electromagnets 5. With the guide rail 3 and electromagnets 5 acting as the motor stator and the permanent magnet 6 and the carrier 4 acting as the motor drive, carrier 4 will convey the chair lift along the path of the guide rail 3. By controlling the energization of the electromagnets 5, the acceleration, deceleration, and the speed of the chair lift can be controlled and varied at will. Accordingly, the ski lift 1 can be decelerated at the mounting and dismounting stations to make it easier for skiers to be safely seated and to be safely discharged from the chair lifts 2. To relieve congestion of chair lifts at the mounting and dismounting stations, the linear motor can be controlled to accelerate the chairs immediately beyond these stations.

Figure 7:
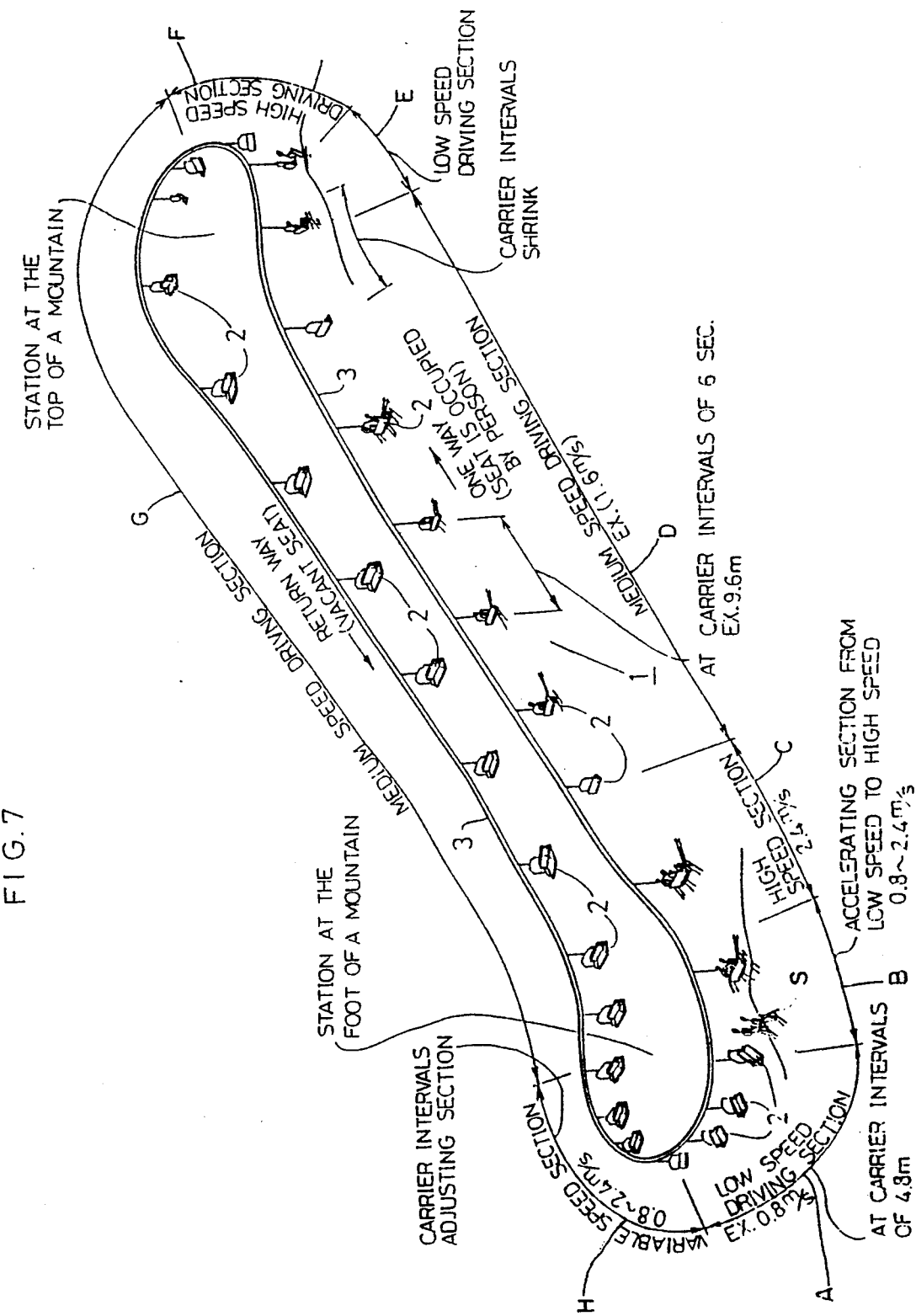
FIG. 7 is an overall schematic perspective view of a preferred embodiment of the inventive variable speed chair lift installation.

FIG. 7 illustrates a ski lift schematically in accordance with a preferred embodiment of the invention. Therein is shown a guide rail 3 having a low speed section A selected to render easy access to the chair lifts 2 by skiers S. Once the skiers are safely seated in a chair, the lift is accelerated from low speed to high speed at B. High speed of the chair lift is maintained at C, and thereafter the chair lift is modulated to medium speed at D, the portion of the guide rail which comprises the longest lift span up the slope. There is a second low speed section E of the guide rail provided as the ski lift approaches the dismounting section at the highest elevation.

The speed control means repeats on the downside of the lift. Following the dismount low speed section E, the guide rail 3 is provided with a high speed section F, there being no need for an intermediate acceleration section, such as C, inasmuch as the chairs will be empty following dismounting at section E. After the high speed section F, the long run downhill decelerates to a medium speed section G, and finally, at H, the lift decelerates to the low mounting speed at A.

The speed of the carrier 4 on the guide rail 3 is controlled by individually regulating the input power to each of the electromagnets 5 in each of the speed zones A through H of the guide rail 3. By so doing, the speed of the carrier 4 in each speed zone may be predetermined or freely varied.

In the conventional tow cable type ski lift, the chairs are secured to the tow cable and uniformly spaced apart. The cable is moved at a constant uniform rate of speed so that the chairs are moving as fast through the mounting and dismounting stations as at any other portion of the lift cycle. Thus, although skilled skiers usually encounter no difficulty in mounting and/or dismounting from chairs moving at a uniform rate of speed, less skilled skiers sometimes experience difficulty with this type of system.

In operation of the subject ski lift, a uniform spacing between chairs is considered desirable and is obtained by controlling the power input to the electromagnets 5 during the long, usually uneventful runs up and down the slope. A spacing of six seconds between chairs has been found to be satisfactory for normal operation.

It will occur to those skilled in the art, upon reading the foregoing description of the preferred embodiments of the invention, taken in conjunction with a study of the drawings, that certain modifications may be made to the invention without departing from the intent or scope of the invention. It is intended, therefore, that the invention be construed and limited only by the appended claims.

We claim:

1. A ski lift comprising: an overhead closed loop guide rail; a chair lift carrier adapted to ride on said guide rail; a chair lift; a chair lift hanger secured to said carrier and depending therefrom to support said chair lift; a plurality of electromagnets secured to said guide rail; means to selectively energize each of said electromagnets; a permanent magnet secured to said carrier and positioned to be driven by said electromagnets when energized; failsafe means to delimit movement of said carrier when said electromagnets are de-energized, said guide rail being suspended from guide rail tower means positioned adjacent the closed loop path of said guide rail; and means to selectively control the energy delivered to each of said electromagnets to vary the speed of movement of said carrier about said closed loop guide rail, said guide rail comprising an I-beam having substantially horizontal upper and lower flanges separated by a vertical web; said plurality of electromagnets being arrayed longitudinally along the top surface of said upper flange about the path of said closed loop of said guide rail; said carrier being adapted to ride on the top surface of said lower flange; and bracket means integral with said carrier and adapted to position said permanent magnet in operative relationship with said electromagnets.

2. The ski lift of claim 1, including apertures formed in said lower flange and longitudinally spaced apart; a plunger; spring means to bias said plunger upwardly through one of said apertures; and a coil and housing therefor, secured to the underside of said lower flange and concentrically centered beneath said one of said apertures, said coil being energizable concurrently with said electromagnets and adapted to retain said plunger in said housing when energized and to release said plunger to said spring bias when said coil is de-energized, said plunger being in the path of movement of said carrier when biased upwardly through said one of said apertures by said spring means.

3. The ski lift of claim 1, wherein said carrier comprises a frame; first wheel means secured to said frame and adapted to roll on the top surface of said lower flange; second wheel means adapted to roll against at least one edge of said lower flange; said hanger being pivotally secured to said carrier; a ratchet wheel having ratchet teeth, mounted to turn with said wheel means; a ratchet detent adapted to permit said ratchet wheel to rotate in one direction; and bias means adapted to urge said detent into locking engagement with one of said ratchet teeth to prevent rotation of said wheel means in the direction opposite to said one direction.

4. The ski lift of claim 3, wherein said first wheel means comprise wheels adapted to roll on said I-beam lower flange on opposite sides of said vertical web; and said second wheel means comprise wheels adapted to roll against opposite edges of said I-beam lower flange.

5. A ski lift comprising: an overhead closed loop guide rail; a chair lift carrier adapted to ride on said guide rail; a chair lift; a chair lift hanger secured to said carrier and depending therefrom to support said chair lift; a plurality of electromagnets secured to said guide rail; means to selectively energize each of said electromagnets; a permanent magnet secured to said carrier and positioned to be driven by said electromagnets when energized; failsafe means to delimit movement of said carrier when said electromagnets are de-energized, said guide rail being suspended from guide rail tower means positioned adjacent the closed loop path of said guide rail; means to selectively control the energy delivered to each of said electromagnets to vary the speed of movement of said carrier about said closed loop guide rail, wherein said closed loop guide rail is divided into chair lift speed zones; said ski lift further comprises a source of electrical energy; means to selectively direct said electrical energy to said electromagnets in said speed zones; and means to selectively vary said electrical energy to said electromagnets, wherein said speed zones comprise in sequence a decelerating speed zone; a chair lift mounting speed zone; an accelerating speed zone; a high speed zone; a medium speed zone; a chair lift dismounting low speed zone; a second high speed zone and a second medium speed zone, said means to selectively vary said electrical energy to said electromagnets being adapted to control the speeds of said chair lift in said speed zones.

6. In a ski lift comprising a closed loop chair lift guide rail, having chair lift mounting and dismounting zones, a plurality of electromagnets secured to said guide rail, and a chair lift carrier adapted to run on said guide rail having permanent magnet means adapted to be driven by said electromagnets, whereby said electromagnets act as the stator of a linear motor to drive said chair lift carrier about said closed loop chair lift guide rail, the method of operating said ski lift comprising the steps of:

(a) moving said chair lift carrier through said chair lift mounting zone of said guide rail at a slow rate of speed;
(b) accelerating the speed of said chair lift carrier to a high rate of speed upon leaving said chair lift mounting zone;
(c) moving said chair lift carrier at said high rate of speed for a predetermined period of time;
(d) reducing said high rate of speed of said chair lift carrier to a medium rate of speed and moving said chair lift carrier at said medium rate of speed for a predetermined period of time;
(e) reducing said chair lift carrier medium rate of speed to a second slow rate of speed at said chair lift dismounting zone of said guide rail;
(f) moving said chair lift carrier through said chair lift dismounting zone at said second slow rate of speed;
(g) accelerating the speed of said chair lift carrier to a second high rate of speed upon leaving said chair lift dismounting zone;
(h) moving said chair lift carrier at said second high rate of speed for a predetermined period of time;
(i) reducing said second high rate of speed of said chair lift carrier to a second medium rate of speed and moving said chair lift carrier at said second medium rate of speed for a predetermined period of time; and
(j) reducing said second medium rate of speed of said chair lift carrier to a third slow rate of speed before said chair lift carrier enters said chair lift mounting zone whereby optimum rates of speed of said chair lift are provided throughout the entire closed loop path of said guide rail.

* * * * *